July 4, 1961   H. PADOVA   2,990,926
FREE-WHEEL ARRANGEMENTS
Filed Jan. 26, 1959
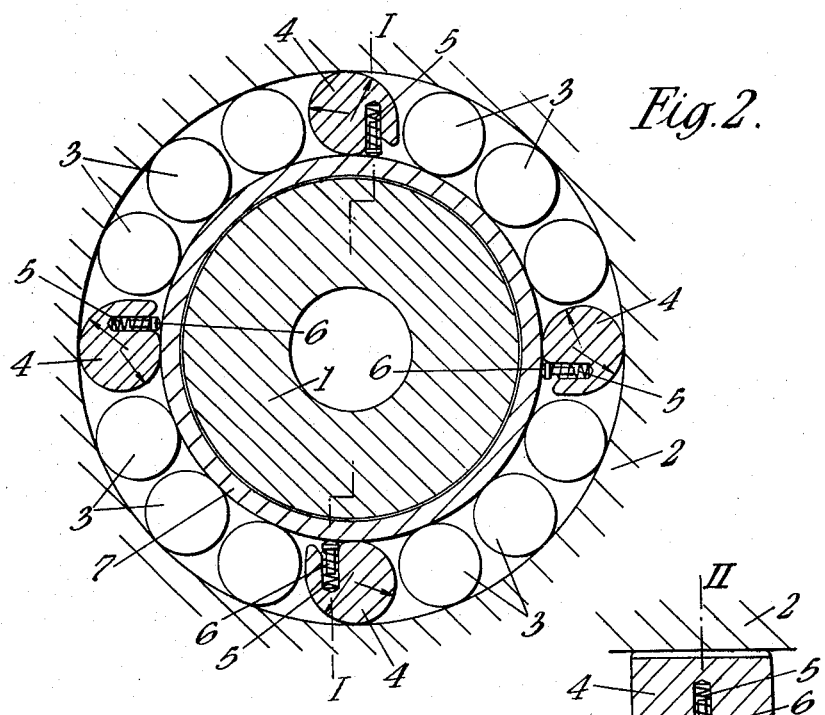
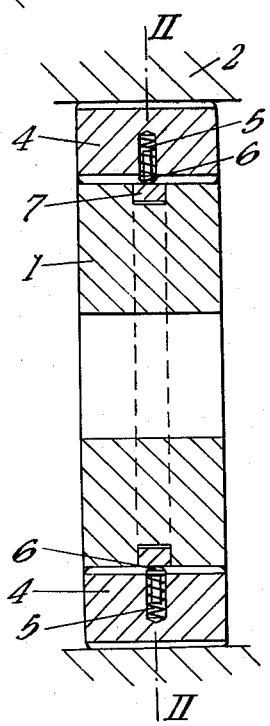
Inventor
H. Padova

United States Patent Office 2,990,926
Patented July 4, 1961

2,990,926
FREE-WHEEL ARRANGEMENTS
Heiman Padova, 12 Cavendish Ave., London, England
Filed Jan. 26, 1959, Ser. No. 789,154
Claims priority, application Great Britain Feb. 4, 1958
1 Claim. (Cl. 192—45)

This invention relates to free-wheel arrangements.

The invention consists of a free-wheel arrangement comprising a roller bearing in which two or more spaced cylindrical rollers are replaced by rollers each arranged to lock the bearing when rotated in one direction and to release it when rotated in the other direction, and being urged in the locking direction by a spring-loaded plunger member mounted in the roller, the head of the plunger member bearing against a ring which is mounted in a recess in the adjacent roll-race member for free rotation with respect thereto.

This provides a relatively simple free-wheel arrangement in which wear of the plungers by friction on the roll-race member is prevented by means of the freely-rotatable ring.

The invention will be further described with reference to the accompanying drawings.

FIGURE 1 is a section on the line I—I of FIGURE 2 and

FIGURE 2 is a section on the line II—II of FIGURE 1 of an embodiment of the invention.

The free-wheel arrangement shown comprises an inner hub roll-race 1 and outer roll-race 2 separated by rollers 3.

These rollers do not form a complete set as four of these (in the embodiment shown) are replaced by locking rollers 4. Each of these locking rollers 4 can be divided by a radial plane through the axis of rotation of the free wheel into a semicylindrical part and a further part in the form of a radially outer quadrant radius increases gradually from its junction with the semi-cylindrical part and a radially inner quadrant which is of roughly square section with a groove parallel to the axis of rotation in the face facing radially inwards. In the centre of the groove is an eccentric bore into which fits a spring 5 around a plunger 6.

The rounded head of plunger 6 is pressed by the spring against a ring 7 of rectangular section which is let into a recess in the hub roll-race 1.

In operation, if part 1 is rotated anti-clockwise in FIGURE 2 the arrangement functions as a bearing. If part 1 is rotated anti-clockwise in FIGURE 2, then the rollers 4 rotate to lock the bearings by virtue of the increase in effective diameter of roller produced and the arrangement serves to transmit power.

In order to ensure that the arrangement is always ready to transmit power the springs 5 act in the direction to force the rollers 4 towards the locking position.

When the arrangement is not transmitting power the ring 7 will remain stationary or rotate with part 2 while part 1 rotates thus eliminating friction at the rounded end of the plunger 6.

The spaced rollers 4 will hold the ring 7 in a spaced position in its groove to reduce friction there.

Various modifications may be made within the scope of the invention. Thus the ring 7 could be in the outer race 2 and the locking rollers 4 inverted.

I claim:

A free-wheel arrangement comprising a radially inner race member, a radially outer race member, a plurality of cylindrical roller bearings located around the inner member and spacing it from the outer member, at least two cam-shaped roller members in spaced positions around the circumference of the inner member, each located between two cylindrical roller bearings adjacent to it and each shaped so that when rotated in one direction it comes into locking engagement between said inner and outer members and when rotated in the other direction it releases the locking engagement, a recess in one of the race members, a freely rotatable ring mounted in said recess and supported by the roller bearings, an eccentric bore in each of said cam-shaped members and a spring-loaded plunger mounted within the bores and compressed by bearing against said ring so as to tend to force the cam-shaped member into locking engagement position.

References Cited in the file of this patent
UNITED STATES PATENTS

| 1,600,490 | Schmidt | Sept. 31, 1926 |
| 2,023,961 | Leichsenring | Dec. 10, 1935 |

FOREIGN PATENTS

| 414,637 | Germany | June 4, 1925 |
| 742,131 | France | Dec. 21, 1932 |
| 756,885 | France | Oct. 2, 1933 |
| 697,948 | Great Britain | Sept. 30, 1953 |